May 9, 1961  J. M. F. WHITE  2,983,148
APPARATUS FOR USE IN THE DYNAMIC BALANCING OF ROTORS
Filed Aug. 15, 1955  5 Sheets-Sheet 2
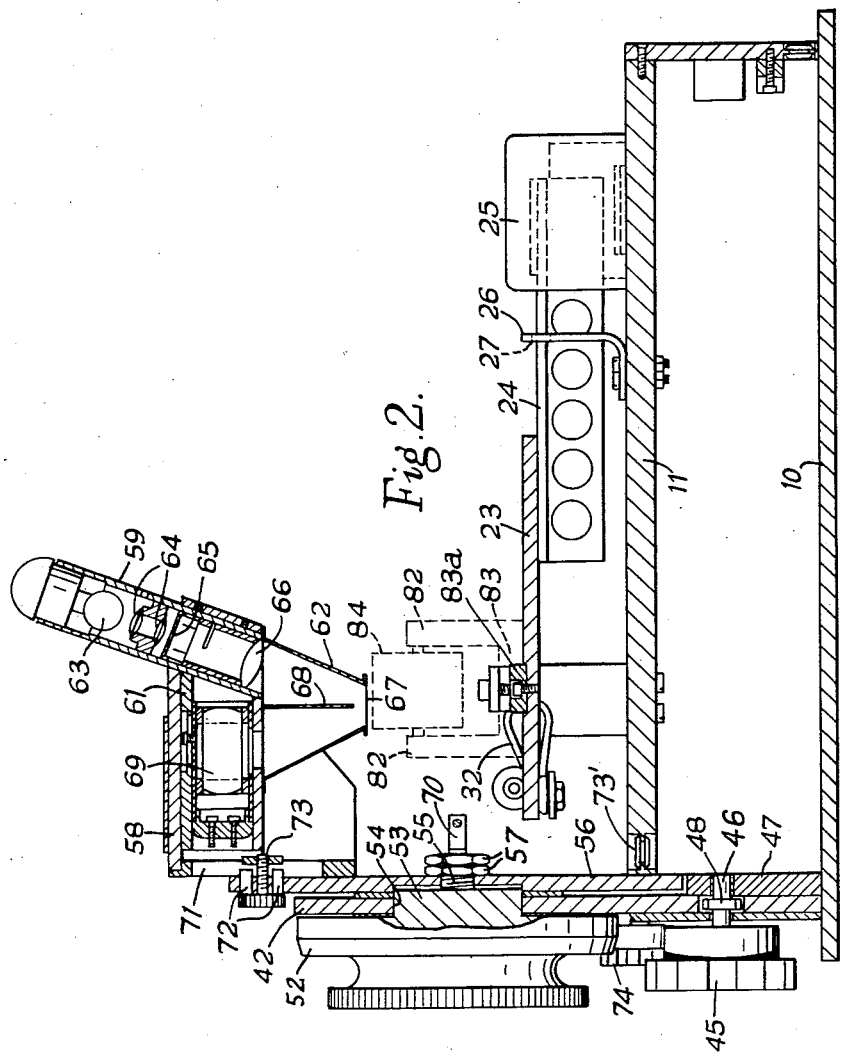
INVENTOR
John Maurice Farbes White
BY
Rines and Rines
ATTORNEYS

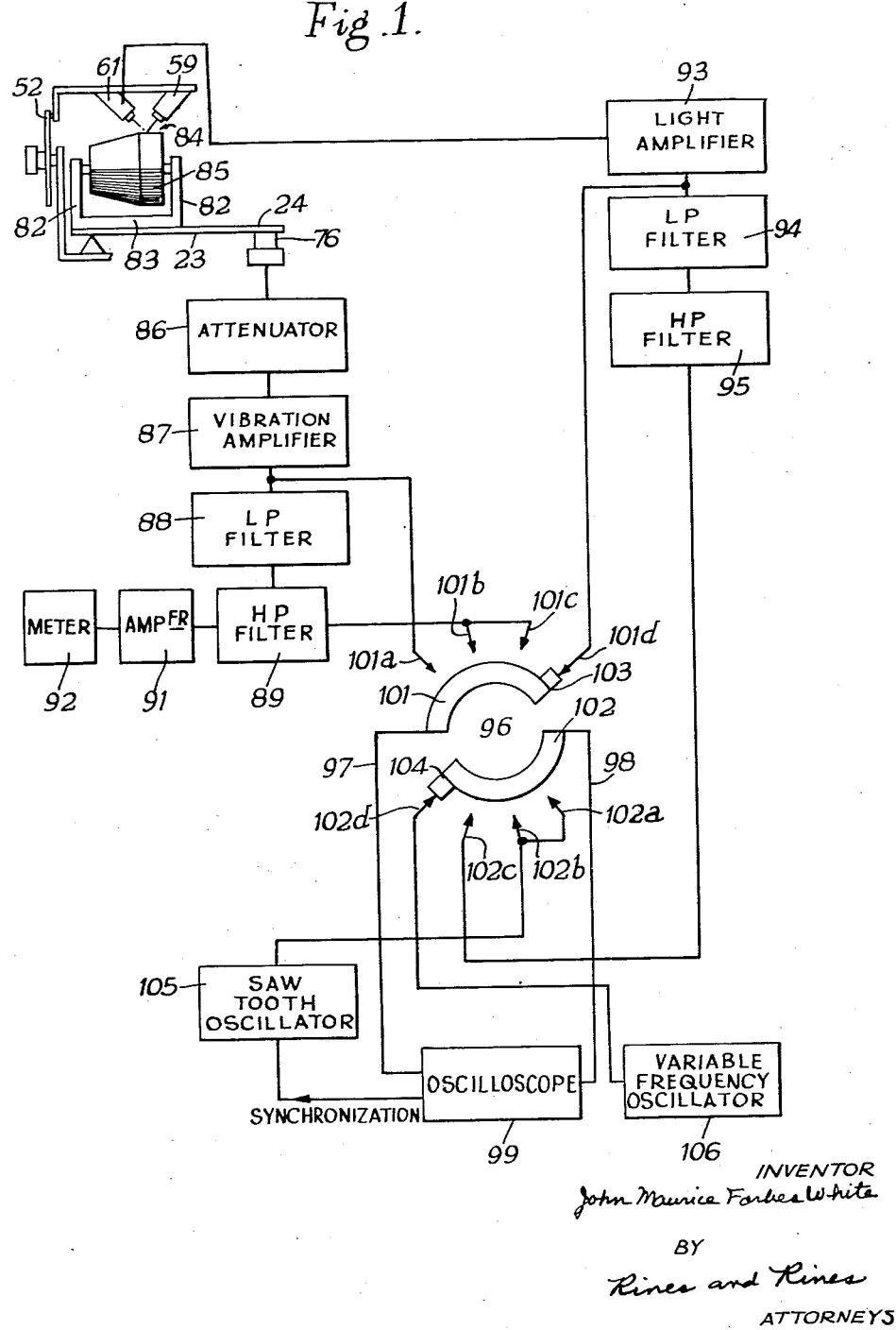

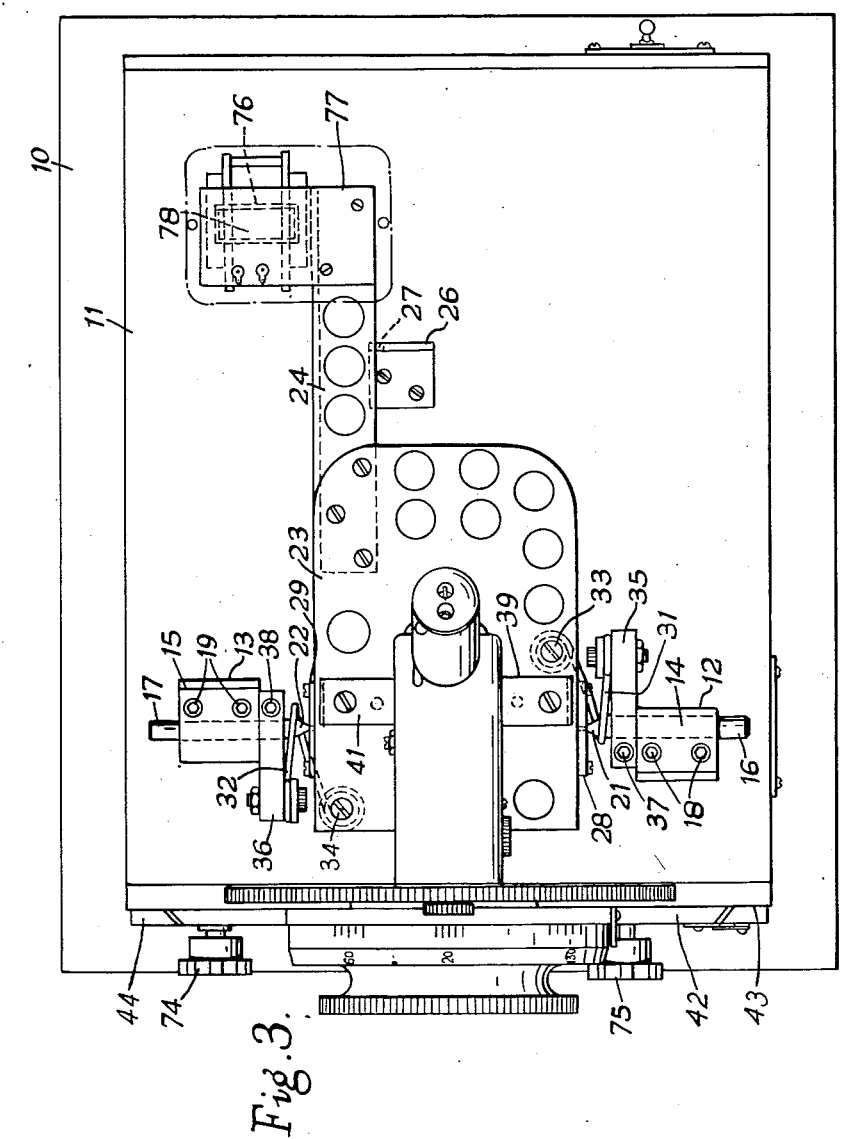

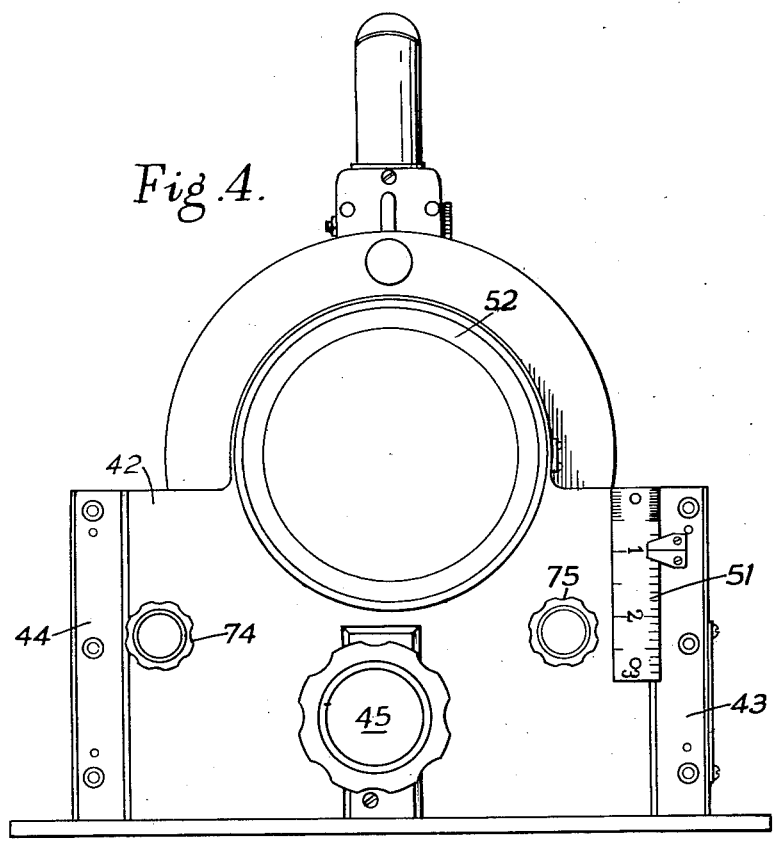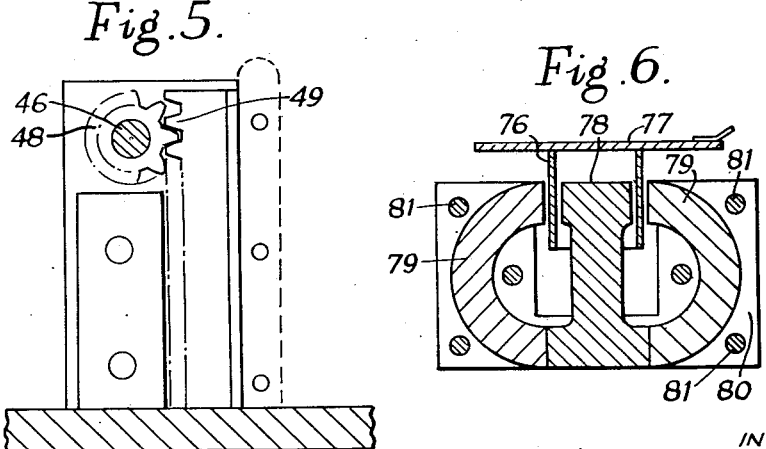

United States Patent Office 2,983,148
Patented May 9, 1961

2,983,148

APPARATUS FOR USE IN THE DYNAMIC BALANCING OF ROTORS

John Maurice Forbes White, Hatfield, England, assignor, by mesne assignments, to The De Havilland Aircraft Company Limited, Hatfield, England, a company of Great Britain Filed Aug. 15, 1955, Ser. No. 528,431

Claims priority, application Great Britain Aug. 17, 1954

6 Claims. (Cl. 73—465)

This invention relates to apparatus for use in the dynamic balancing of rotors such, for example, as the rotors of electric dynamos, alternators or motors, gyroscopes or the like in which it is necessary for the rotor to be accurately balanced dynamically. It is well known that dynamic balancing may be achieved in a roughly balanced rotor by removing small quantities of rotor material from the periphery of the rotor at two positions spaced from one another and the present invention is directed to the provision of apparatus by which two such positions and the quantity of material to be removed at such positions may be accurately determined in a simple manner.

In accordance with the present invention apparatus for determining the magnitude and position of unbalance of a rotor in a selected plane transverse to the rotation axis, comprises a rotor carrier in which the rotor is rotatably mounted, driving means to rotate the rotor at a selected speed, a support to which the carrier is detachably secured, a single mounting for the support having a hinge axis arranged so that the selected plane is spaced from the hinge axis, the carrier being reversible to enable the selected plane to pass through the hinge axis, a single presettable vibration pick-up to generate a first signal of alternating voltage of rotation frequency from the oscillation of the support about the hinge axis resulting from rotor rotation, a housing angularly adjustable about the rotor axis, a photocell carried by the housing and arranged to generate a second signal of alternating voltage of rotation frequency as a result of the movement of markings on the rotor surface by the photocell, two similar amplifiers connected to amplify the first and second signals, two similar band-pass filters whose frequency band-pass includes the rotation frequency connected one to the output of each amplifier, a device to measure the amplified first signal to give a measure of the magnitude of the unbalance in the selected plane and a phase comparing device fed with the two filtered amplifier outputs which indicates the relative phase between the outputs which is adjustable by movement of the photo-cell housing about the rotor to positions giving phase and anti-phase and indicating the angular position of the unbalance relative to the rotor marking.

It will be appreciated that unbalance of the rotor in the hinge axis plane is neutralised, and then oscillation of the mounting can be considered to result from unbalance in the selected plane only.

The rotor carrier may be reversible on the support to facilitate the determination of unbalance of the rotor with the previously selected plane passing through the hinge axis.

As different sized rotors require different sized carriers, there may be an adjustable mounting for the photocell housing, whereby the axis of angular movement of the housing may be adjusted to coincide with the rotor axis. To facilitate operation of the photo cell the rotors to be checked include permanent markings on their periphery which, for example, may be by staining or sand blasting the surface where a mark is desired so that a reference position is obtained.

In order that the invention may be clearly understood, one embodiment thereof will be described by way of example with respect to the accompanying drawings in which;

Figure 1 is a schematic diagram showing the electrical circuit elements operating in conjunction with the balancing apparatus;

Figure 2 is a vertical cross section of the balancing apparatus;

Figure 3 is a plan view of the balancing apparatus;

Figure 4 is a front elevation of the balancing apparatus;

Figure 5 is a detail cross section showing operation of the racking movement of the front of the apparatus;

Figure 6 is a detail view of the magnetic vibration pick up; and

Figure 7:
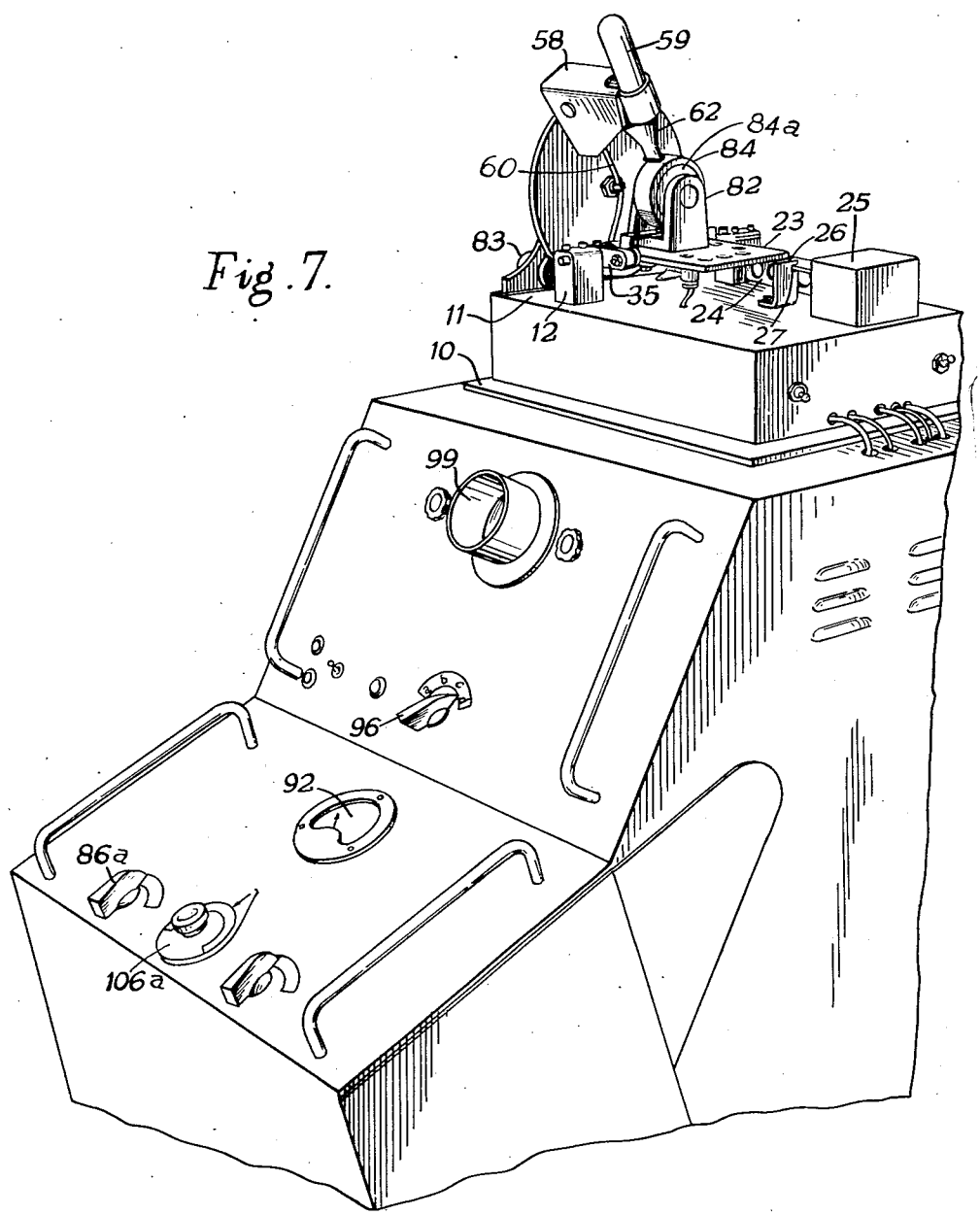
Figure 7 is a perspective view of the complete machine including balancing apparatus and associated electric equipment.

Referring initially to the balancing apparatus shown in Figures 2 to 7, there is provided a main base 10 on which is mounted an auxiliary base 11 supported from the base 10 by side and back members to form a baselike structure. On base 11 (Figure 3) a pair of supporting brackets 12 and 13 is provided having clamps 14 and 15 at their upper ends to receive two spindles 16 and 17. The spindles may be clamped in position by screws 18 and 19. The spindles have tapered ends 21 and 22 for supporting a vibration table or support 23 and from this table a lever 24 extends. The lever is of angle section metal drilled for lightness and its remote end projects into a housing 25 (Figure 2) in which the magnetic pick-up is located. This pick-up will be described in detail with reference to Figure 6. Movement of the lever 24 is limited by a stop 26 fixed on the base 11 and including a recess 27 (Figure 7) engaging over a flange of the lever 24. The tapered ends 21 and 22 of the spindles engage in holes in two plates 28 and 29 (Figure 3) attached one on each side of the table 23 so that the table may vibrate angularly about the axis of these spindles. This axis will be referred to as the hinge axis. For the purpose of maintaining the table in a position where the lever 24 is central in its range of movement in the recess 27, two tension springs 31 and 32 are provided each of which comprises a single turn of piano wire secured by screws 33 and 34 respectively to the table at their inner ends and secured at their outer ends respectively to two blocks 35 and 36. These blocks are mounted on the spindles 16 and 17 and are angularly adjustable. Locking in any desired position is accomplished by lock screws 37 and 38 respectively. These blocks are adjusted angularly to tension springs 31 and 32 against one another and to cause lever 24 to take up a central position in recess 27. These springs are of such strength that the frequency of natural vibration of the table and the rotor mounted thereon is considerably lower than the frequency at which the rotor is to be rotated. Screw down clips 39 and 41 are provided on the table for screwing the rotor mounting in position. This will be described later in this specification.

The front 42 of the apparatus (Figure 3) is secured to the two bases by means of two vertical slides 43 and 44 and is adjustable on these slides by means of a knob 45 (Figure 4). This knob is carried on spindle 46 (Figure 2) rotating in bearings carried in a plate 47 secured to the base 10. A pinion 48, integrally formed on the spindle 46, co-operates with a rack 49 (Figure 5) secured to the front 42 whereby the front may be raised or lowered. A scale 51 (Figure 4) enables the height of the front to be set accurately. On the front 42 a dial 52 (Figure 2) is rotatably mounted by means of a cylindrical extension 53 thereof which engages in a circular hole 54 in the front. A threaded rod 55 extends from the extension 53 and a metal disc 56 is mounted on the extension 53, being locked in position by nuts 57 on the rod 55. The dial 52 is graduated in degrees and indicates the angular setting of disc 56 relative to the front 42. A bracket 58 is mounted on the disc 56, to carry a lamp housing 59, a photo-electric cell mounting 61 and a hood 62. The lamp housing 59 contains an electric lamp 63, a pair of condenser lenses 64, a small circular aperture 65 and a projecting lens 66, the arrangement being such that a small spot of light is projected so as to be in focus at an opening 67 of the hood 62. This spot of light is the image of the illuminated aperture 65. The hood 62 includes a central partition 68 dividing the hood into two parts of which one part is over the end of the lamp housing 59 and the other part is over an opening in the photo-electric cell housing 61. A photo-electric cell 69 is located in the housing 61. The two housings rotate with disc 56. The bracket 58 is adjustably mounted on the disc by means of a slot 71 in the bracket, pins 72 in the disc and a clamping nut and bolt 73 whereby the bracket, housings and hood are adjustable radially of the disc to accommodate rotors of different diameters. The rising and falling action front 42 enables adjustment to be made so that the centre of the disc 56 is lined up with the axis of a rotor mounted on the table. A cable clip 70 is carried on the end of the rod 55 to support a cable 60 (Figure 7) passing from the two housings and through a grommet 73' in the base 11. The front 42 carries two further knobs 74 and 75 of which knob 74 serves to lock the front 42 in position and knob 75 is geared to give slow motion action of dial 52.

The magnetic pick-up located in the housing 25, includes a rectangular moving coil 76 (Figure 6) carried on a bracket 77 extending from the lever 24 (Figure 3). The coil moves over a central pole piece 78 (Figure 6) with which two permanent magnets 79 are associated to give two gaps traversed by magnetic flux through which the coil 76 can move. The magnets 79 and pole piece 78 are supported between plates 80 by bolts 81. The flux passing the gaps is uniform and the coil is longer than the gap so that the voltage induced in coil 76 is proportional to speed of coil movement over the range allowed by the recess 27 in the stop 26. The magnetic pick-up is preset by centralisation of the lever 24 in the recess 27. Thereafter no adjustment is effected.

A bracket for supporting the rotor is of inverted U shape having a flat base 83 and two upstanding arms 82 between which is rotatably mounted a rotor 84. The bracket used will depend on the shape and size of the rotor to be tested and generally speaking a bracket must be made up for each kind of rotor to be tested. This offers no great difficulty, particularly if a large number of similar rotors are to be tested. The bracket is located in position by a lug 83a secured to the table which fits a recess in the base 83. Means must also be provided to rotate the rotor 84 which in the case of an electrically driven gyroscope rotor is comparatively simple. In the particular embodiment (Figure 7) the rotor 84 is hollow and a stator 84a projects from one of the arms 82 into the hollow interior of the rotor 84. A gyroscope rotor driven by an air stream may easily be tested by use of an air jet to the rotor.

It is desirable that no mechanical drive for the rotor should be provided extending from a fixed position to the rotor on the table, since the drive would interfere to a certain extent with oscillation of the table. However, it is within the scope of the invention to use such a mechanical drive if it is arranged to give minimum interference with table oscillation. For example, a flexible shaft drive could be used on a belt drive extending from the table in a direction parallel to the hinge axis.

Referring now to Figure 1, the apparatus of Figures 2 to 7 is shown diagrammatically with appropriate reference numerals. The rotor under test is indicated at 84 and the peripheral surface 85 thereof is treated so that it has a darker colour extending over 180° of the periphery. The electrical circuit associated with the apparatus comprises a number of elements which individually are well known so that specific details of these elements are unnecessary in this description. The output of the moving coil 76 is fed initially to a step by step attenuator 86 which is adjustable by a knob 86a (Figure 7). The output is then fed to an amplifier 87 referred to as a vibration amplifier, since it operates on voltage developed by vibration of the moving coil 76. The amplifier output is fed through two filters 88 and 89 of which filter 88 has low pass characteristics with an upper cut off frequency of about 180 cycles per second and filter 89 has high pass characteristics with a lower cut off frequency of 90 cycles per second. The combined action of the filters is to give a band pass effect over the range 90 to 180 cycles per second, which is the equivalent of rotation speeds of 5,400 to 10,800 revolutions per minute of the rotor 84. Such speeds are obtained, by supplying to the stator 84a, alternating current of appropriate frequency. The filter output is fed to a further amplifier 91 and then to a meter 92. By means of the step by step attenuator 86 it is possible to keep the inputs to the amplifiers 87 and 91 to a level where the output fed to the meter is linearly related to the input. The attenuator actually has six positions representing full scale deflections of the meter for maximum inputs to the attenuator of .005, .015, .050, .15, .5 and 1.5 volts. Thus a range of measurement of the moving coil voltage in the range of .001 to 1.5 volts is provided and as will be described later in this specification, this voltage actually is proportional to the amount of unbalance of the rotor.

The spot of light projected upon the rotor periphery from the housing 59 is reflected into the photo-electric cell in the housing 61 and a signal is generated as the rotor rotates due to the shading of one half of the rotor periphery. The wave form is square and it is necessary to filter it to provide a sinusoidal wave form. Initially this signal is fed to an amplifier 93 referred to for convenience as the light amplifier. This amplifier as far as possible is made similar to the vibration amplifier 87 in order to obtain the same phase change characteristics through the amplifiers. The output of the light amplifier is fed to two filters 94 and 95 having exactly the same characteristics as the filters 88 and 89. The filters provide an output whose use will be described further in this specification.

Provision is made in the electrical apparatus to make four separate oscilloscope observations of the vibration and light signals, and for this purpose a four position switch 96 is provided. This switch is a two pole switch having two output connections 97 and 98 to feed into an oscilloscope 99 to control the two oscilloscope deflections which give rise to a trace on the oscilloscope screen. The switch is shown diagrammatically to include two arcuate conductors 101 and 102 in permanent connection with conductors 97 and 98 whilst the switch rotor carries two moving contacts 103 and 104 which operate to connect each bar to any one of four adjacent fixed contacts. Each of the four switch positions are indicated by the reference *a, b, c* and *d* (Figure 7), and individual fixed contacts are identified by the combination of the switch position reference and the reference of the associated conductor 101 or 102.

In switch position *a* the output of the vibration amplifier is connected through contact 101a to the conductor 97 and the output of a sawtooth oscillator 105 is connected through contact 102a to the conductor 98. The sawtooth oscillator is constantly synchronised from the signal applied to the oscilloscope by the conductor 97. The trace given on the oscilloscope will be sinusoidal and will show rotor bearing faults as irregularities of the trace. In switch position *b* the output of the filters 88 and 89 is fed through contact 101b to the conductor 97 whilst the sawtooth generator 105 is connected through contact 102b to the conductor 98. The trace should now be perfectly sinusoidal and the operation of the filters 88 and 89 may thus be checked. In switch position c the output of the filters 88 and 89 is connected through contact 101c to the conductor 97 whilst the output of the filters 94 and 95 is connected through contact 102c to the conductor 98. In this position location of the position of unbalance of the rotor is accomplished by moving the dial 52 to rotate the lamp and photo-electric cell housings about the rotor. The trace shown on the oscilloscope will be elliptical except when the dial 52 is so adjusted that the vibration and light outputs are in phase and anti-phase. In this case the trace will be a straight line inclined to the horizontal. The direction of inclination will determine whether the outputs are in phase or anti-phase. In switch position d, the output from the light amplifier 93 is fed through contact 101d to the conductor 97 whilst the output from a variable frequency oscillator 106 is connected through contact 102d to the conductor 98. The frequency of the oscillator is adjustable by the knob 106a (Figure 7). The trace on the oscilloscope will be a Lissajou figure until the frequency of rotation of the rotor is brought into agreement with the frequency of oscillator when a static ellipse or straight line is shown. By this means it is possible to check the speed of rotation of the rotor.

When in use the machine is normally used for testing a number of rotors of the same type whereby graphs may be produced showing the connection between the moving coil output voltage and the amount of the out of balance. Also a mounting bracket may be made to carry each particular type of rotor. For calibration purposes a balanced rotor is employed which has small screw holes in its periphery to receive grub screws of varying sizes. By inserting the grub screws one by one a series of meter readings may be obtained corresponding to various degrees of out of balance. The amount of out of balance can be represented as the product of a weight and its distance from the axis of rotation and when referring to gyroscope rotors it is measured in milligram centimetres (mg. cm.). A graph drawn to relate the amount of out of balance to the moving coil output should be a straight line. By the use of a test rotor including a known out of balance weight it is also possible to calibrate the machine as regards the relative position of the out of balance weight and position of the shaded periphery of the rotor, i.e. to calibrate the machine as regards phase changes through the amplifiers and filters at the operative rotational speed. Preferably the test rotor includes three equally spaced positions to receive the known out of balance weight and the rotor is tested for these three positions. The mean phase correction of the three corrections obtained is then assumed to be the proper correction. When the characteristics of the machine are known for a particular type of rotor the procedure to measure the out of balance force is as follows. The bracket carrying the rotor is clamped on to the table to engage lug 83a and thus the bracket corresponding to one predetermined plane of the rotor is lined up with a line on the table directly above the hinge axis. The rotor drive is then switched on and the rotor is run up to a predetermined speed such as 8,000 r.p.m. The speed is checked against the variable frequency oscillator in position d of the switch 96, to ensure that it runs at the desired speed. The switch is then switched to position a to check the accuracy of the rotor bearings and then to position c for adjustment of the dial 52 to identify the part of the rotor periphery with which unbalance of the rotor is associated. The meter reading at the correct rotor speed when considered in conjunction with the attenuator setting indicates the amount of unbalance in the selected plane, i.e. the plane which is not lined up with the hinge axis. Having noted the dial reading and the amount of unbalance the rotor and bracket are reversed in their position on the table and lug 83a the arrangement being such that the other rotor plane is now lined up with the hinge axis. The various operations are now repeated and the amount and position of the unbalance in the plane previously lined up with the hinge axis is obtained. The rotor is then removed and metal is removed at the periphery at the two indicated positions the depth of drilling being controlled so that the predetermined amounts of metal are removed. For this purpose a graph is used on which is plotted one or more curves showing the amount of metal removed for various depths of drilling using different sizes of drill. When the drilling is completed the rotor is again tested on the machine and possibly some further minor drilling may be necessary.

By using the machine at a fixed rotor speed only, the small variations in the vibration and light amplifiers may be allowed for, particularly the variations in phase change in the two amplifiers. If more than one speed were used it would be difficult to make allowance for the different phase changes of each amplifier. Similarly two similar sets of filters are used on both the vibration and light amplifiers to ensure similar phase changes.

In measuring a determined angle on the rotor, the machine is arranged so that measurement is made from the trailing edge of the more darkly coloured part of the rotor periphery in the direction of rotation. By considering the inclination of the oscilloscope trace it is possible to decide whether the measurement is the actual indicated angle or whether it is the reciprocal of this angle.

Any method of marking the surface of the rotor may be used but in particular the preferred method is to sand blast one half of the periphery. It is not then possible for any of the marking to break away from the rotor when actually in use and so upset the balance of the rotor.

Where the rotor includes plane ends these planes or rather planes slightly spaced inwardly from the ends are used as the selected planes and for removing rotor material drills having a set depth of penetration and removing a definite quantity of material are used. By removing the material from the end planes at positions close to or removed from the axis, one obtains the equivalent effect of removing varying quantities of peripheral rotor material. Determination of the positions follows the same lines as described above but the coil output voltage determines the distance from the axis the material to be removed is from the end faces.

What is claimed is:

1. Apparatus for determining the magnitude and position of unbalance of a rotor in a selected plane transverse to the rotation axis, comprising a rotor carrier in which the rotor is rotatably mounted, driving means to rotate the rotor at a selected speed, a support to which the carrier is detachably secured, a single mounting for the support having a hinge axis arranged so that the selected plane is spaced from the hinge axis, the carrier being reversible to enable the selected plane to pass through the hinge axis, a single presettable vibration pick-up to generate a first signal of alternating voltage of rotation frequency from the oscillation of the support about the hinge axis resulting from rotor rotation, a light source directing light to the rotor, a housing angularly adjustable about the rotor axis, a photo-cell carried by the housing and arranged to generate a second signal of alternating voltage of rotation frequency as a result of the movement of markings on the rotor surface and light reflected therefrom, two similar amplifiers connected to amplify the first and second signals, two similar band-pass filters whose frequency band-pass includes the rotation frequency connected one to the output of each amplifier, a device to measure the amplified first signal to give a measure of the magniture of the unbalance in the selected plane and a phase comparing device fed with the two filtered amplifier outputs which indicates the relative phase between the outputs, which relative phase is adjustable by movement of the photo-cell housing about its axis to positions where the filtered outputs are in phase or in anti-phase relationship, the position of the photo-cell housing then being indicative of the angular position of the unbalance relative to the rotor marking.

2. Apparatus as claimed in claim 1, wherein the photo-cell housing is mounted upon a rotatable member and is radially adjustable on the member.

3. Apparatus for determining the magnitude and position of unbalance of a rotor in a selected plane transverse to the rotation axis, comprising a support, a rotor carrier in which the rotor is rotatably mounted and which is detachably secured to the support, driving means to rotate the rotor at a selected speed, a single mounting for the support having a hinge axis arranged so that a transverse plane other than the selected plane passes through the hinge axis, a single presettable vibration pick-up to generate a first alternating voltage of rotation frequency from the oscillation of the support about the hinge axis resulting from rotor rotation, a light source directing light to the rotor, a photo-cell, a housing for the photo-cell angularly adjustable about a housing axis parallel to the rotor axis, an adjustable mounting for the housing, whereby the housing axis is adjustable to coincide with the rotor axis, the photo-cell being arranged to generate a second alternating voltage of rotation frequency as a result of movement of marking on the rotor surface and light reflected therefrom, two similar amplifiers connected to amplify the first and second voltages, two similar band-pass filters whose frequency band-pass includes the rotation frequency connected one to the output of each amplifier, a device to measure the amplified first voltage to give a measure of the magnitude of the unbalance in the selected plane and a phase comparing device fed with the two filtered amplifier outputs to indicate their relative phase, which relative phase is adjustable by movement of the photo-cell housing about its axis to positions where the filtered outputs are in phase or in anti-phase relationship, the position of the photo-cell housing then being indicative of the angular position of the unbalance relative to the rotor marking.

4. Apparatus as claimed in claim 3, wherein the rotor carrier is reversible on the support to facilitate the determination of unbalance of the rotor with the previously selected plane passing through the hinge axis.

5. Apparatus as claimed in claim 3, wherein the photo-cell housing is mounted upon a rotatable member and is radially adjustable on the member.

6. Apparatus as claimed in claim 4, wherein the photo-cell housing is mounted upon a rotatable member and is radially adjustable on the member.

References Cited in the file of this patent

UNITED STATES PATENTS

| | | |
|---|---|---|
| 1,612,329 | Trumpler | Dec. 28, 1926 |
| 1,695,904 | Soderberg | Dec. 18, 1928 |
| 2,043,845 | Thearle | June 9, 1936 |
| 2,243,458 | Esval et al. | May 27, 1941 |
| 2,381,645 | Carlstein | Aug. 7, 1945 |
| 2,420,765 | Annis | May 20, 1947 |
| 2,521,141 | Allen | Sept. 5, 1950 |
| 2,622,437 | Frank | Dec. 23, 1952 |

FOREIGN PATENTS

| | | |
|---|---|---|
| 655,151 | Great Britain | July 11, 1951 |
| 843,314 | Germany | July 7, 1952 |
| 867,312 | Germany | Feb. 16, 1953 |